(12) United States Patent
Nakazono et al.

(10) Patent No.: US 9,363,440 B2
(45) Date of Patent: Jun. 7, 2016

(54) IMAGING DEVICE AND IMAGING METHOD THAT SETS A PHASE DIFFERENCE BETWEEN FIRST AND SECOND SYNCHRONIZATION SIGNALS

(71) Applicant: OLYMPUS CORPORATION, Tokyo (JP)

(72) Inventors: Keisuke Nakazono, Tokyo (JP); Hideru Ikeda, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 318 days.

(21) Appl. No.: 14/049,940

(22) Filed: Oct. 9, 2013

(65) Prior Publication Data

US 2014/0118596 A1 May 1, 2014

(30) Foreign Application Priority Data

Oct. 30, 2012 (JP) ................................. 2012-239063

(51) Int. Cl.
*H04N 5/232* (2006.01)
(52) U.S. Cl.
CPC ................................. *H04N 5/23293* (2013.01)
(58) Field of Classification Search
None
See application file for complete search history.

(56) References Cited

U.S. PATENT DOCUMENTS

| 7,710,468 B2 * | 5/2010 | Uchida | H04N 5/23293 348/222.1 |
| 2003/0122952 A1 * | 7/2003 | Kuroiwa | H04N 1/2112 348/333.11 |

FOREIGN PATENT DOCUMENTS

| JP | 3988461 B2 | 10/2007 |
| JP | 2010-103935 A | 5/2010 |

* cited by examiner

*Primary Examiner* — Twyler Haskins
*Assistant Examiner* — Angel L Garces-Rivera
(74) *Attorney, Agent, or Firm* — Westerman, Hattori, Daniels & Adrian, LLP

(57) ABSTRACT

An imaging device includes an imaging unit which outputs captured image data corresponding to a pixel signal, a plurality of image processing units which generate any one of first image data being performed first image processing on the captured image data and second image data being performed second image processing on the captured image data, a display processing unit which causes an image corresponding to the second image data to be displayed on a display device which displays an image corresponding to image data input at a predetermined timing of a second synchronization signal, and a control unit which changes a setting of a phase difference between the first synchronization signal and the second synchronization signal and switches between the first image processing and the second image processing to be executed by each of the plurality of image processing units.

8 Claims, 9 Drawing Sheets

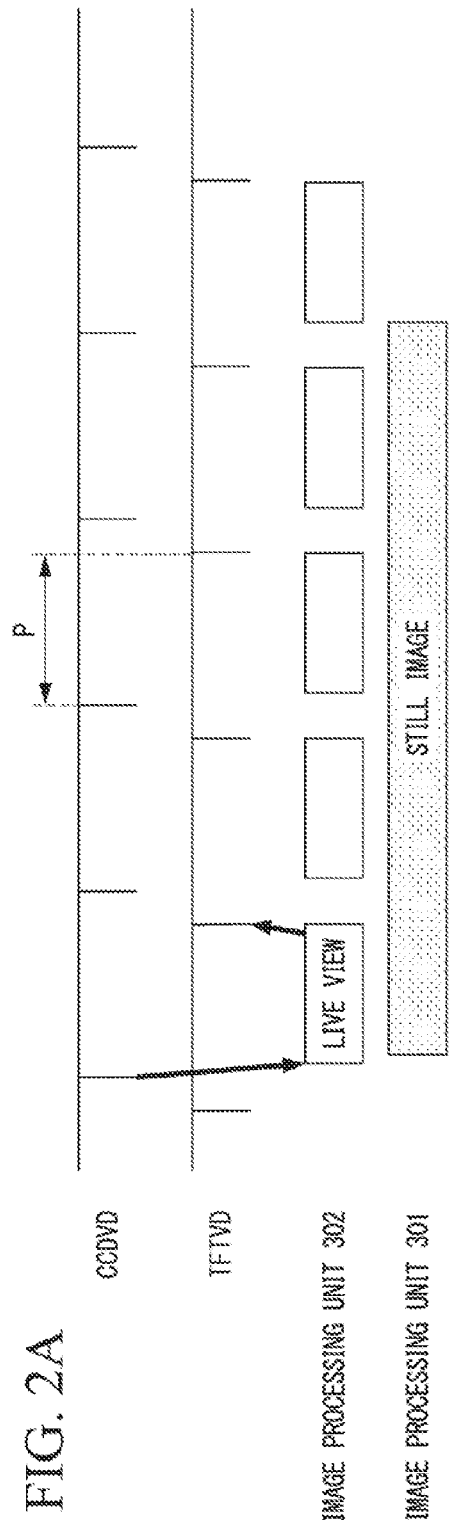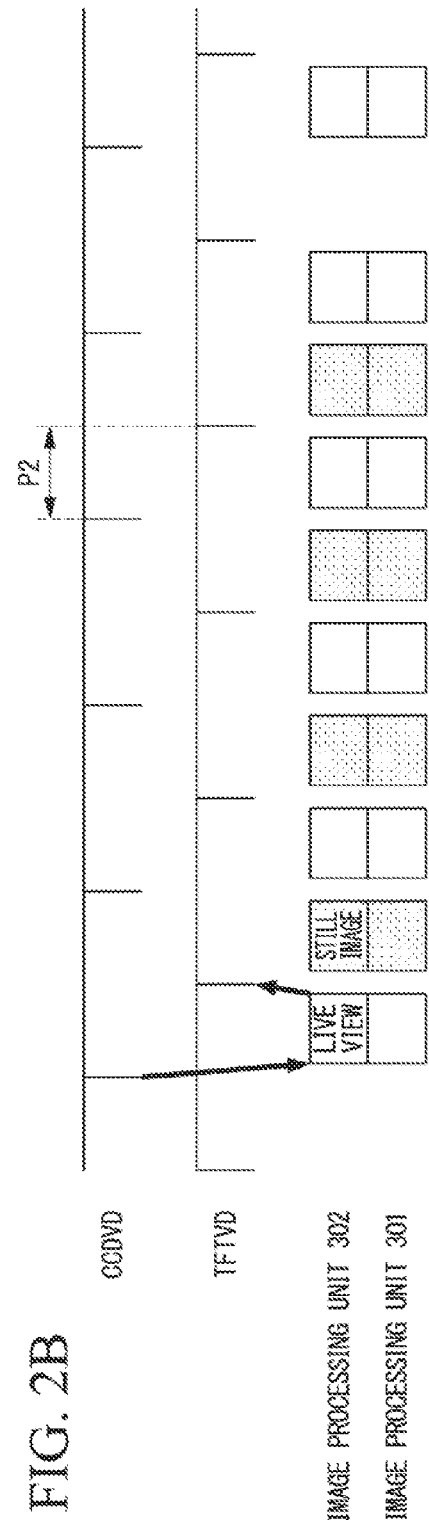

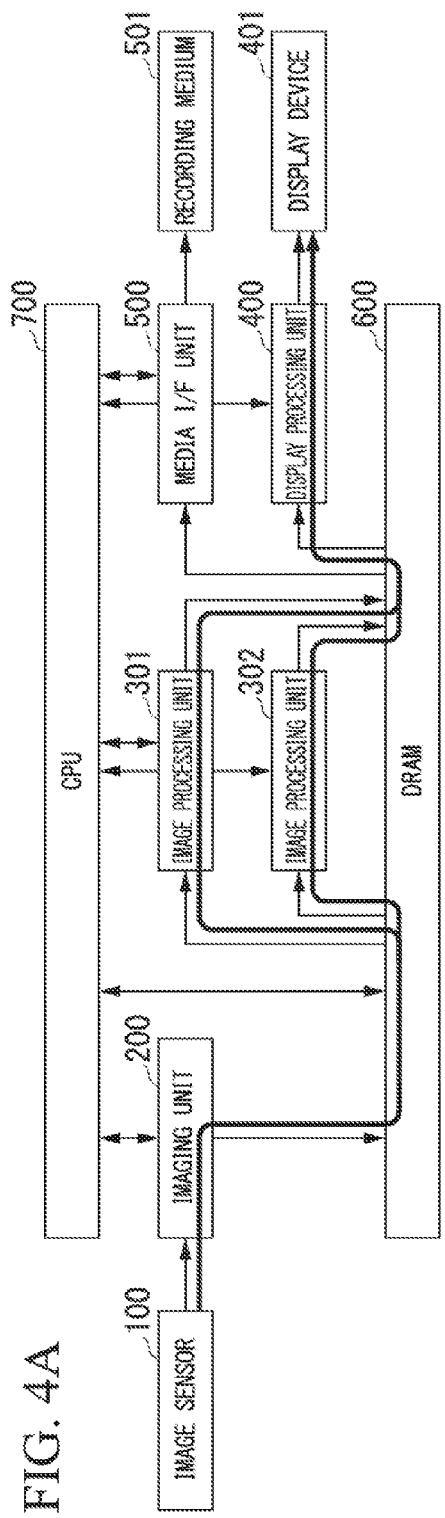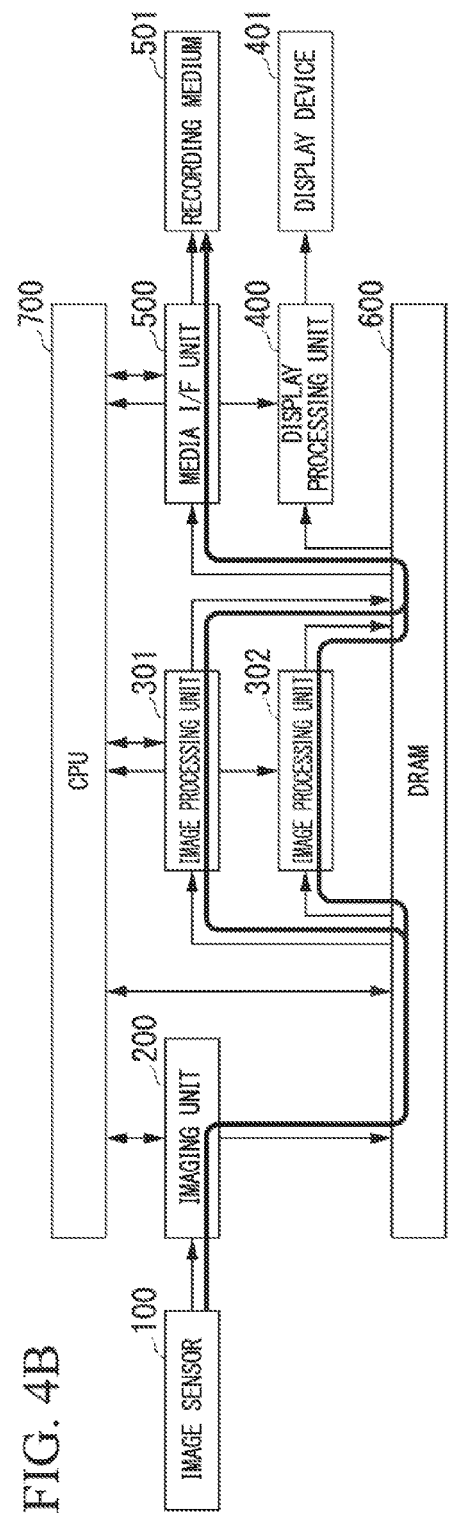
FIG. 4A
FIG. 4B

FIG. 5A
FIG. 5B
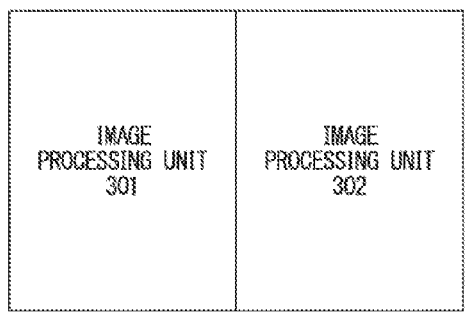
FIG. 5C
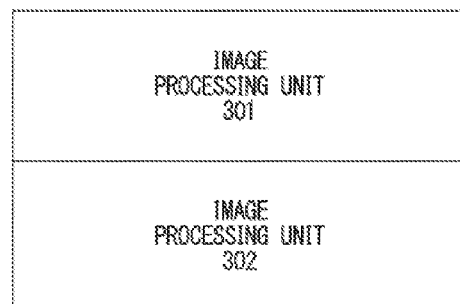
FIG. 5D
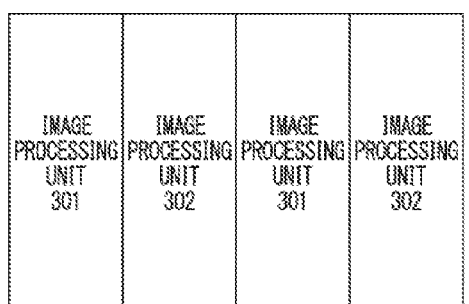
FIG. 5E

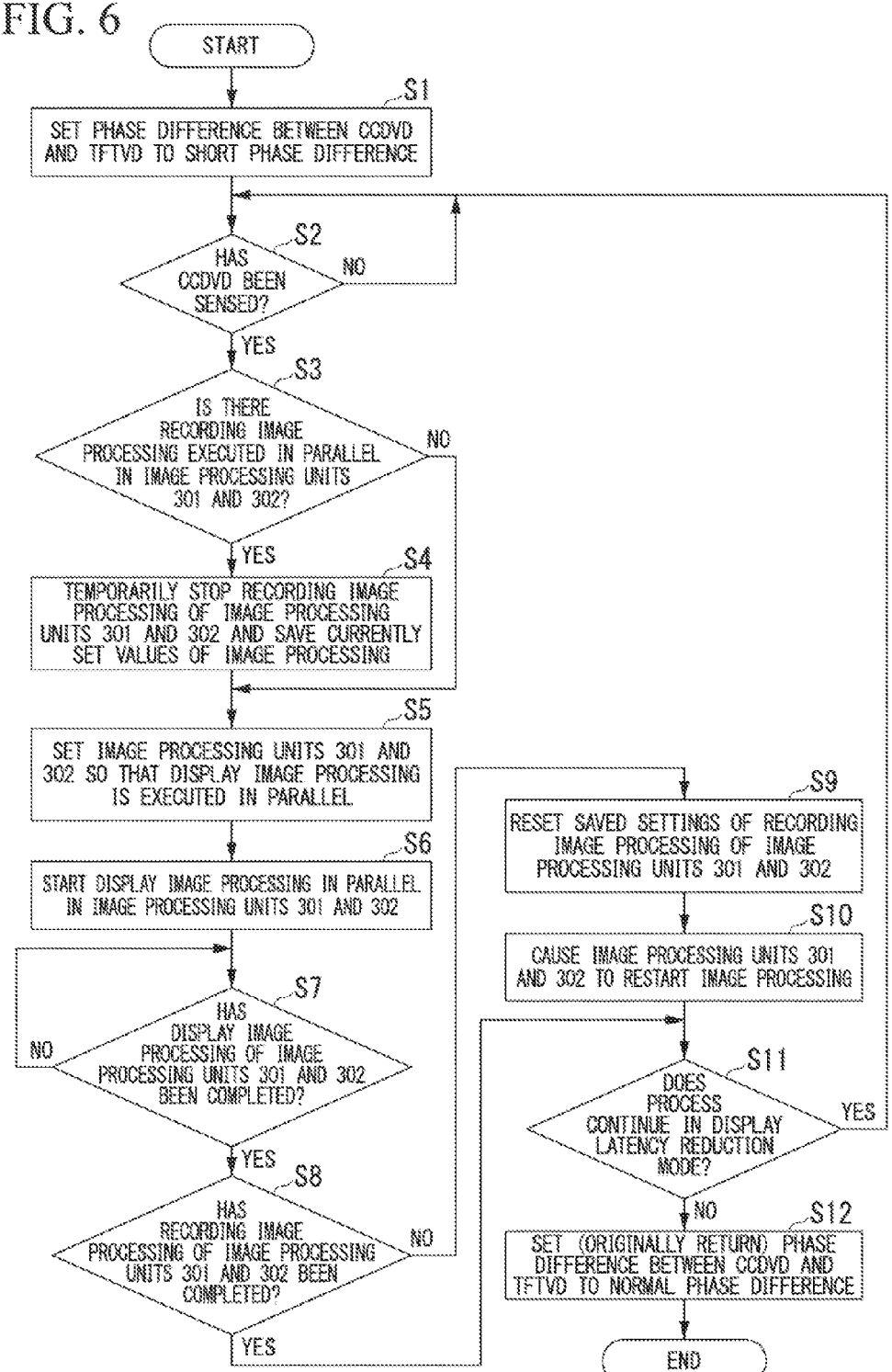

IMAGING DEVICE AND IMAGING METHOD THAT SETS A PHASE DIFFERENCE BETWEEN FIRST AND SECOND SYNCHRONIZATION SIGNALS

BACKGROUND OF THE INVENTION

1. Field of the Invention

The present invention relates to an imaging device and an imaging method.

Priority is claimed on Japanese Patent Application No. 2012-239063, filed Oct. 30, 2012, the content of which is incorporated herein by reference.

2. Description of Related Art

In an imaging device such as an electronic camera without an optical finder, a display device such as a thin film transistor (TFT) liquid crystal display (LCD) or an electronic view finder (EVF) is provided as a configuration for checking a subject to be photographed. A moving image of a subject to be photographed is displayed on a display device using a so-called live view function. In the live view function, an image (hereinafter referred to as "live view image") of each frame to be displayed on the display device is generated from a pixel signal of each frame continuously input from an image sensor and the live view image of each frame is sequentially displayed on the display device for every frame.

FIG. 9 is a timing chart illustrating an example of a relationship between the timing of the image sensor and the timing of the display device in the imaging device of the related art. A vertical synchronization signal CCDVD illustrated in FIG. 9 is an imaging vertical synchronization signal representing the timing at which the image sensor starts an output of an imaged pixel signal, and a vertical synchronization signal TFTVD is a display vertical synchronization signal representing the timing at which the display device starts a display of the live view image. As illustrated in FIG. 9, the vertical synchronization signals CCDVD and TFTVD are synchronized and a phase difference (see a phase difference P of FIG. 9) between the vertical synchronization signals CCDVD and TFTVD is maintained at a predetermined value, so that an image captured by the image sensor can be displayed on the display device after a fixed period of time.

In addition, for example, technology of an imaging device including a plurality of image processing units is disclosed in Japanese Patent No. 3988461 and Japanese Unexamined Patent Application, First Publication No. 2010-101935. In the technology disclosed in Japanese Patent No. 3988461 and Japanese Unexamined Patent Application, First Publication No. 2010-103935, each image processing unit performs image processing of either recording image processing in which a still image to be recorded is generated or display image processing in which an image to be displayed is generated, so that the recording image processing and the display image processing can be simultaneously executed in parallel. Using the technology disclosed in Japanese Patent No. 3988461 and Japanese Unexamined Patent Application, First Publication No. 2010-103935, an image for checking the still image to be recorded can be displayed on the display device at an early timing.

SUMMARY OF THE INVENTION

According to a first aspect of the present invention, an imaging device is provided including: an imaging unit which includes a solid-state imaging device, which outputs a pixel signal corresponding to incident subject light at a predetermined timing of a first synchronization signal, the imaging unit being configured image data corresponding to the pixel signal output by the solid-state imaging device; a plurality of image processing units which generate any one of first image data, which is performed first image processing on the captured image data output from the imaging unit, and second image data, which is performed second image processing on the captured image data; a display processing unit which outputs the second image data to a display device, which displays an image corresponding to image data input at a predetermined timing of a second synchronization signal, and causes an image corresponding to the second image data to be displayed; and a control unit which changes a setting of a phase difference between the first synchronization signal and the second synchronization signal and switches between the first image processing and the second image processing to be executed by each of the plurality of image processing units.

According to a second aspect of the present invention, in the imaging device of the first aspect, when a predetermined image processing unit among the plurality of image processing units generates the first image data and an image processing unit different from the predetermined image processing unit generates the second image data, the control unit sets the phase difference between the first synchronization signal and the second synchronization signal serial to a first phase difference, and, when the phase difference between the first synchronization signal and the second synchronization signal is set to a second phase difference which is shorter than the first phase difference, the control unit switches the first image processing and the second image processing to be executed by each of the plurality of image processing units so that some image processing units among the plurality of image processing units share and execute image processing of any one of the first image processing and the second image processing on the same captured image data in parallel.

According to a third aspect of the present invention, in the imaging device of the second aspect, the control unit, upon detecting the first synchronization signal in a state in which the phase difference between the first synchronization signal and the second synchronization signal has been set to the second phase difference, first switches so that the some image processing units share and execute the second image processing in parallel at a timing corresponding to the detected first synchronization signal, and, the control unit, after being ended the generation of the second image data by the second image processing, switches so that the some image processing units share and execute the first image processing in parallel.

According to a fourth aspect of the present invention, in the imaging device of the third aspect, the control unit, upon detecting the first synchronization signal when the some image processing units share and execute the first image processing in parallel in the setting of the second phase difference, interrupts the first image processing currently being executed by the some image processing units at a timing corresponding to the detected first synchronization signal, and causes the some image processing units to share and execute the second image processing in parallel after causing to be stored a current setting or a state of the interrupted first image processing, and, the control unit, after being ended the generation of the second image data by the second image processing, cause to return the current setting or a state of the interrupted first image processing and then causes the some image processing units to continuously restart the first image processing.

According to a fifth aspect of the present invention, in the imaging device of the third or fourth aspect, the control unit divides a region of the captured image data into a plurality of regions in the left and right directions and causes any one of the first image processing and the second image processing for the same captured image data before dividing the region, to be shared and be executed in parallel in the plurality of image processing units by causing one of the plurality of image processing units to execute any one of the first image processing and the second image processing on captured image data of each of the divided regions.

According to a sixth aspect of the present invention, in the imaging device of the third or fourth aspect, the control unit divides a region of the captured image data into a plurality of regions in the up and down directions and causes any one of the first image processing and the second image processing for the same captured image data before dividing the region, to be shared and be executed in parallel in the plurality of image processing units by causing one of the plurality of image processing units to execute any one of the first image processing and the second image processing on captured image data of each of the divided regions.

According to a seventh aspect of the present invention, in the imaging device of the third or fourth aspect, the control unit divides a region of the captured image data into a plurality of regions in the up, down, left, and right directions and causes any one of the first image processing and the second image processing for the same captured image data before dividing the region, to be shared and be executed in parallel in the plurality of image processing units by causing one of the plurality of image processing units to execute any one of the first image processing and the second image processing on captured image data of each of the divided regions.

According to an eighth aspect of the present invention, in the imaging device of any one of the first to seventh aspects, the first image processing is image processing in which recording image data for recording an image corresponding to the captured image data is generated as the first image data, and the second image processing is image processing in which display image data for displaying the image corresponding to the captured image data of each frame corresponding to a pixel signal of each frame which the solid-state imaging device outputs based on the timing of the first synchronization signal in the display device, is generated as the second image data.

According to a ninth aspect of the present invention, an imaging method is provided including: an imaging step of outputting captured image data corresponding to a pixel signal output by a solid-state imaging device which outputs the pixel signal corresponding to incident subject light at a predetermined timing of a first synchronization signal; a plurality of image processing steps of generating any one of first image data being performed first image processing on the captured image data output in the imaging step and second image data being performed second image processing on the captured image data; a display processing step of outputting the second image data to a display device, which displays an image corresponding to image data input at a predetermined timing of a second synchronization signal, and causing an image corresponding to the second image data to be displayed; and a control step of changing a setting of a phase difference between the first synchronization signal and the second synchronization signal and switches between the first image processing and the second image processing to be executed in each of the plurality of image processing steps.

BRIEF DESCRIPTION OF THE DRAWINGS

FIGS. 2A and 2B are a timing chart illustrating an example of a relationship of timings of an image sensor and a display device and image processing to be executed in the imaging device of this embodiment.

FIGS. 4A and 4B are a diagram schematically illustrating a flow of image data in the imaging device of this embodiment.

FIGS. 5A, 5B, 5C, 5D and 5E are a diagram schematically illustrating an example of a method of dividing a region of image data on which each image processing unit executes image processing in the imaging device of this embodiment.

FIG. 6 is a flowchart illustrating a processing procedure of changing display latency of a live view image and switching image processing to be executed in the imaging device of this embodiment.

DETAILED DESCRIPTION OF THE INVENTION

Figure 1:
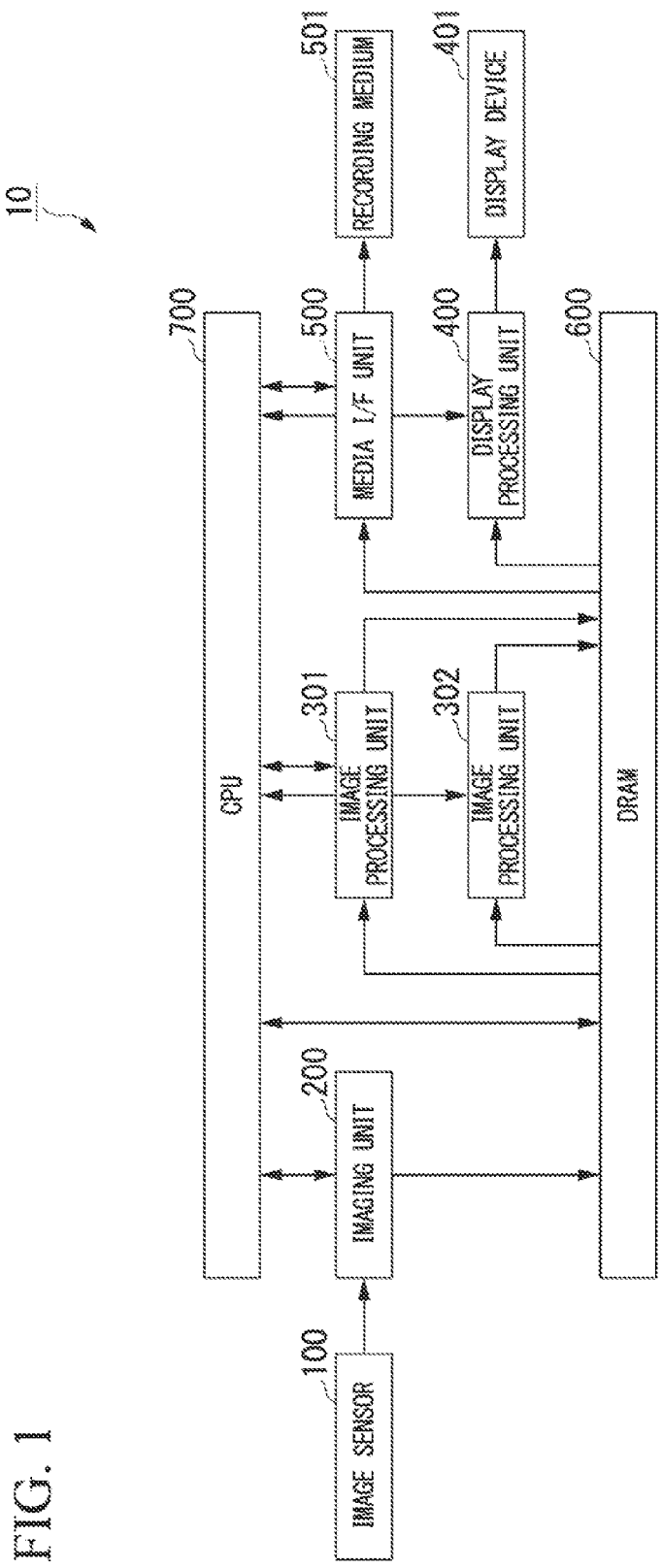
FIG. 1 is a block diagram illustrating a schematic configuration of an imaging device in an embodiment of the present invention.

Hereinafter, an embodiment of the present invention will be described with reference to the drawings. FIG. 1 is a block diagram illustrating a schematic configuration of an imaging device in this embodiment. The imaging device 10 illustrated in FIG. 1 includes an image sensor 100, an imaging unit 200, two image processing units 301 and 302, a display processing unit 400, a display device 401, a media interface (I/F) unit 500, a recording medium 501, a dynamic random access memory (DRAM) 600, and a central processing unit (CPU) 700.

Each of the imaging unit 200, the image processing units 301 and 302, the display processing unit 400, and the media I/T unit 500 within the imaging device 10, for example, stores (writes) data in the DRAM 600 through a direct memory access (DMA) transfer and acquires (reads) data from the DRAM 600.

The image sensor 100 is a solid-state imaging device represented by a charge coupled device (CCD) image sensor for photoelectrically converting an optical image of a subject formed by a lens (not illustrated) or a complementary metal-oxide semiconductor (CMOS) image sensor. The image sensor 100 outputs a pixel signal corresponding to light of a subject to the imaging unit 200. When the imaging device 10 performs a live view display the image sensor 100 sequentially outputs a pixel signal of each frame corresponding to the light of the subject to the imaging unit 200.

The imaging unit 200 performs various processing on the pixel signal input from the image sensor 100, and stores (writes) data (hereinafter referred to as "captured image data") corresponding to the pixel signal in the DRAM 600. In addition, when the imaging device 10 performs the live view display, the imaging unit 200 sequentially stores (writes) captured image data of each frame corresponding to a pixel signal of each frame input from the image sensor 100 in the DRAM 600.

Each of the image processing units 301 and 302 acquires (reads) the captured image data stored in the DRAM 600, generates image data for recording (hereinafter referred to as recording image data) by performing noise cancellation, a YC conversion process, a resizing process, and a joint Photographic Experts Group (JPEG) compression process on the acquired image data, and stores (writes) the generated recording image data in the DRAM 600 again. Because recording image processing to be executed by each of the image processing units 301 and 302 is similar to a process in the imaging device of the related art, detailed description thereof is omitted.

In addition, each of the image processing units 301 and 302 generates image data for a display (hereinafter referred to as "display image data) by performing display image processing such as resizing (reduction) of an image size capable of being displayed by the display device 401 on the captured image data, and stores (writes) the generated display image data in the DRAM 600 again. In addition, when the imaging device 10 performs a live view display, each of the image processing units 301 and 302 sequentially acquires (reads) captured image data of each frame stored in the DRAM 600 and sequentially stores (writes) display image data of each frame generated by sequentially performing display image processing on the acquired captured image data of each frame as a live view image in the DRAM 600. Because the display image processing to be executed by each of the image processing units 301 and 302 is similar to that in the imaging device of the related art, detailed description thereof is omitted.

In addition, each of the image processing units 301 and 302 acquires (reads) recording image data stored in the DRAM 600, generates image data for reproduction (hereinafter referred to as "reproduction image data") by performing reproduction image processing such as a JPEG decompression process, and stores (writes) the generated reproduction image data in the DRAM 600 again. Because the reproduction image processing to be executed by each of the image processing units 301 and 302 is similar to that in the imaging device of the related art, detailed description thereof is omitted.

The display processing unit 400 acquires (reads) the display image data or the reproduction image data stored in the DRAM 600, and performs display processing such as a superimposition process of superimposing on-screen display (OSD) display data on the acquired display image data and reproduction image data to output a processing result to the display device 401. In addition, when the imaging device 10 performs a live view display, the display processing unit 400 sequentially acquires (reads) a live view image of each frame stored in the DRAM 600, and performs display processing on the acquired live view image to sequentially output processing results to the display device 401.

The display device 401 is a display device such as a TFT-LCD or an organic electroluminescence (EL) display, and displays an image corresponding to display image data, reproduction image data, or a live view image after the display processing output from the display processing unit 400. The display device 401 may be a display device such as an EVF or an external device such as a television. In addition, although the display device 401 also serves as a component of the imaging device 10 in FIG. 1, the display device 401 may be a configuration attachable to or detachable from the imaging device 10.

The media I/F unit 500 acquires (reads) recording image data stored in the DRAM 600, and causes the recording medium 501 to record the acquired (read) recording image data. In addition, the media unit 500 reads image data recorded on the recording medium 501, and transfers (writes) the read image data as recording image data to the DRAM 600.

The recording medium 501 is a recording medium such as a secure digital (SD) memory card or compact flash (CF) (registered trademark), and records the recording image data output from the media I/F unit 500. In addition, recorded image data is read by the media I/F unit 500. Although the recording medium 501 also serves as a component of the imaging device 10 in FIG. 1, the recording medium 501 is a configuration attachable to or detachable from the imaging device 10.

The DRAM 600 is a memory to be accessed from each component provided in the imaging device 10. The DRAM 600 records various data in a processing process of each component within the imaging device 10. In FIG. 1, a configuration in which each component within the imaging device 10 accesses the DRAM 600 is illustrated. However, for example, there may be a configuration in which access to the DRAM 600 is controlled by a DRAM controller (not illustrated). In this case, each component within the imaging device 10, for example, outputs an access request for the DRAM 600 according to a DMA transfer to the DRAM controller. In response to the access request for the DRAM 600 in the DMA transfer input from each component, the DRAM controller controls an operation of storing (writing) data in the connected DRAM 600 and acquiring (reading) data from the DRAM 600.

The CPU 700 controls each component within the imaging device 10, that is, the overall imaging device 10. For example, an operation of each component within the imaging device 10 is controlled according to a shooting operation or a reproduction operation in the imaging device 10. In addition, when the imaging device 10 performs a live view display, the CPU 700 performs control such as a change of settings of components within the imaging device 10 in order to change display latency of a live view image to be displayed on the display device 401. Details regarding the control for changing the display latency to be performed by the CPU 700 will be described later.

Next, control when the imaging device 10 performs the live view display will be described. First, a relationship of display latency of the live view image in the imaging device 10 and an operation of each component within the imaging device 10 will be described. FIGS. 2A and 2B are timing charts each illustrating an example of a relationship of timings of the image sensor 100 and the display device 401 and image processing to be executed in the imaging device 10 of this embodiment. A vertical synchronization signal CCDVD illustrated in FIGS. 2A and 2B is an imaging vertical synchronization signal representing the timing at which the image sensor 100 starts an output of a pixel signal corresponding to light of an imaged subject. A vertical synchronization signal TFTVD is a display vertical synchronization signal representing the timing at which the display device 401 starts a display of the live view image.

FIGS. 2A and 2B are timing charts of the state in which display image processing of each frame of a live view image and recording image processing of a still image to be recorded are executed in parallel to generate recording image data of the still image to be recorded on the recording medium 501 while the live view image is displayed on the display device 401. As illustrated in FIGS. 2A and 2B, the vertical synchronization signals CCDVD and TFTVD are synchronized and a phase difference between the vertical synchronization signals CCDVD and TFTVD is maintained at a predetermined value. Thereby, an image captured by the image sensor 100 can be displayed on the display device 401 after a fixed period of time.

In FIG. 2A, timings of the operations of the image processing units 301 and 302 when the imaging device 10 does not reduce display latency of the live view image, that is, when a delay time until a live view image is displayed on the display device 401 after the image sensor 100 performs imaging is similar to that of a live view display in the imaging device of the related art (hereinafter referred to as a "display latency normal mode"), are illustrated. In addition, in FIG. 2B, timings of the operations of the image processing units 301 and 302 when the imaging device 10 reduces display latency of the live view image, that is, when a delay time until a live view image is displayed on the display device 401 after the image sensor 100 performs imaging is shorter than that of a live view display in the imaging device of the related art (hereinafter referred to as a "display latency reduction mode"), are illustrated.

When the imaging device 10 generates recording image data of a still image while displaying a live view image in the display latency normal mode, the phase difference between the vertical synchronization signals CCDVD and TFTVD is set to a phase difference P as illustrated in FIG. 2A. One image processing unit (the image processing unit 301 in FIG. 2A) executes recording image processing in which recording image data of the still image is generated, and the other image processing unit (the image processing unit 302 in FIG. 2A) executes display image processing in which a live view image of each frame is generated.

Figure 3A:
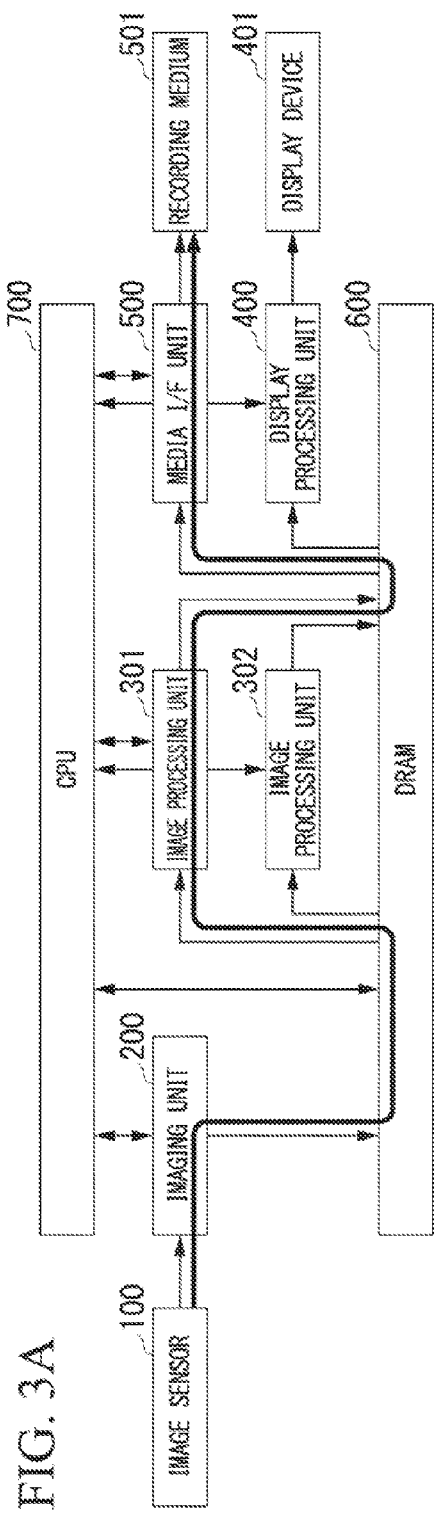
FIGS. 3A and 3B are a diagram schematically illustrating a flow of image data in the imaging device of this embodiment.
Figure 3B:
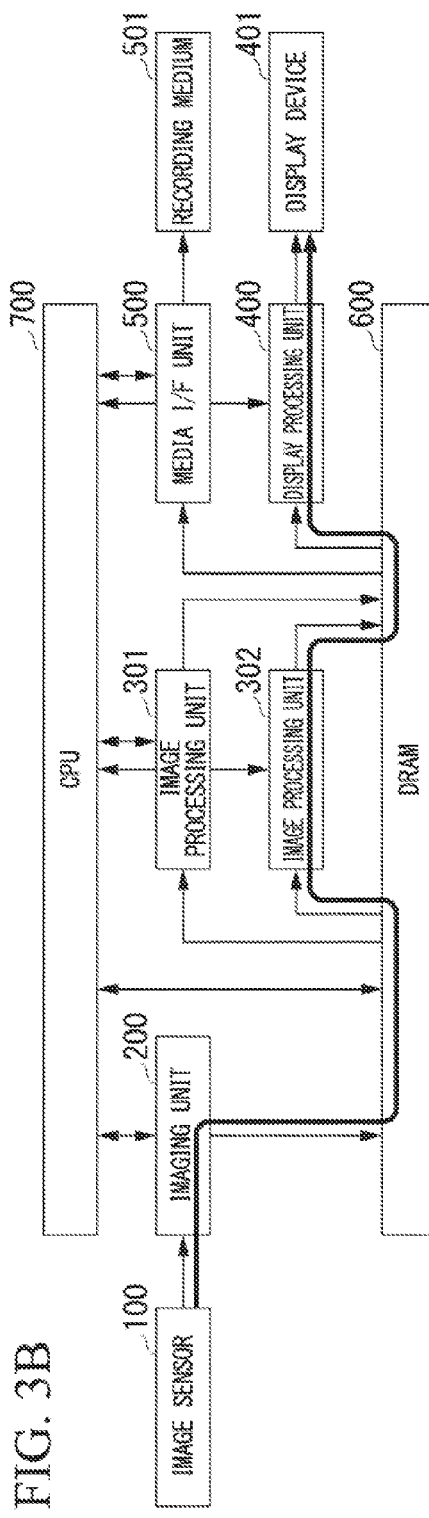

Here, a flow of image data when the imaging device 10 generates the recording image data of the still image while displaying the live view image in the display latency normal mode will be described. FIGS. 3A and 3B are diagrams each schematically illustrating a flow of image data in the imaging device 10 of this embodiment.

In FIG. 3A, the flow of the image data when the recording image data of the still image is generated and recorded on the recording medium 501 is illustrated. In FIG. 3B, the flow of the image data when the live view image is generated and displayed on the display device 401 is illustrated. The flows of the image data illustrated in FIGS. 3A and 3B are similar to the flows of the image data when the operations are performed in the imaging device of the related art.

When the imaging device 10 causes the recording medium 501 to record recording image data of the still image in the display latency normal mode, the image sensor 100 first performs imaging and stores (writes) captured image data produced after the imaging unit 200 has performed various processing on a pixel value output from the timing of the vertical synchronization signal CCDVD in the DRAM 600 as illustrated in FIG. 3A.

Subsequently, the image processing unit 301 acquires (reads) the captured image data stored in the DRAM 600, and stores (writes) recording image data produced by performing the recording image processing on the acquired captured image data in the DRAM 600 again.

Ultimately the media I/F unit 500 acquires (reads) the recording image data stored in the DRAM 600, and causes the recording medium 501 to record the acquired (read) recording image data.

In addition, when the imaging device 10 generates a live view image in the display latency normal mode and causes the display device 401 to display the live view image, the image sensor 100 first performs imaging and stores (writes) captured image data produced after the imaging unit 200 has performed various processing on a pixel signal of a current frame output from the timing of the vertical synchronization signal CCDVD in the DRAM 600 as illustrated in FIG. 3B.

Subsequently the image processing unit 302 acquires (reads) the captured image data of the current frame stored in the DRAM 600, and stores (writes) display image data (live view image) produced by performing the display image processing on the acquired captured image data in the DRAM 600 again.

Ultimately the display processing unit 400 acquires (reads) the live view image stored in the DRAM 600 and outputs the acquired (read) live view image to re display device 401 at the timing before the vertical synchronization signal TFTVD. Thereby the display device 401 is caused to display an image corresponding to the live view image of the current frame from the timing of the vertical synchronization signal TFTVD. Thereafter, likewise, a live view display is performed by iterating imaging of the next frame, display image processing, and an output of the live view image to the display device 401.

On the other hand, when the imaging device 10 generates recording image data of the still image while displaying the live view image in the display latency reduction mode, the two image processing units 301 and 302 share and execute the display image processing in which the live view image of the same frame is generated as illustrated in FIG. 2B. In addition, after the generation of the live view image of each frame has ended as illustrated in FIG. 2B, the two image processing units 301 and 302 share and execute recording image processing in which recording image data of the same still image is generated.

As illustrated in FIG. 2A, a time period covering a plurality of vertical synchronization signals CCDVD and TFTVD is necessary until recording image processing in which one still image is generated ends. Because of this, if the timing at which a live view image of the next frame is generated is reached when the imaging device 10 executes recording image processing as illustrated in FIG. 2B, the image processing units 301 and 302 perform an operation of temporarily interrupting recording image processing currently being executed and restarting continuous recording image processing after the generation of the live view image of the next frame has ended.

Here, a flow of image data when the imaging device 10 generates recording image data a of a still image while displaying a live view image in the display latency reduction mode will be described. FIGS. 4A and 4B are diagrams each schematically illustrating flow of image data in the imaging device 10 of this embodiment.

A flow of image data when the live view image is generated and displayed on the display device 401 is illustrated in FIG. 4A, and a flow of image data when recording image data of a still image is generated and recorded on the recording medium 501 is illustrated in FIG. 4B.

When the imaging device 10 generates the live view image in the display latency reduction mode and causes the display device 401 to display the generated live view image, the image sensor 100 first performs imaging and stores (writes) captured image data produced after the imaging unit 200 has performed various processing on a pixel signal of a current frame output from the timing of the vertical synchronization signal CCDVD in the DRAM 600 as illustrated in FIG. 4A. This process is similar to the display latency normal mode.

Subsequently, each of the image processing units 301 and 302 acquires (reads) captured image data of a corresponding region in captured image data of a current frame stored in the DRAM 600, and stores (writes) display image data (a live view image) of each region produced by performing display image processing on the acquired captured image data in the DRAM 600 again. When each of the image processing unit 301 and the image processing unit 302 stores the live view image in the DRAM 600 again, each live view image is stored as one live view image in the DRAM 600. Details regarding a region of captured image data corresponding to each of the image processing units 301 and 302 will be described later.

Ultimately the display processing unit 400 acquires (reads) a live view image stored in the DRAM 600 and outputs the acquired (read) live view image to the display device 401 at the timing before the vertical synchronization signal TFTVD. Thereby an image corresponding to a live view image of the current frame is displayed on the display device 401 from the timing of the vertical synchronization signal TFTVD. This process is similar to the display latency normal mode. Thereafter, likewise, the live view display is performed by iterating imaging of the next frame, display image processing, and an output of the live view image to the display device 401.

In addition, when the imaging device 10 causes the recording medium 501 to record the recording image data of the still image in the display latency reduction mode, the image sensor 100 first performs imaging and stores (writes) captured image data produced after the imaging unit 200 has performed various processing on a pixel signal output from the timing of the vertical synchronization signal CCDVD in the DRAM 600 as illustrated in FIG. 4B. This process is similar to the display latency normal mode.

Subsequently each of the image processing units 301 and 302 acquires (reads) captured image data of a corresponding region in captured image data stored in the DRAM 600, and stores (writes) recording image data of each region produced by performing recording image processing on the acquired captured image data in the DRAM 600 again. When each of the image processing unit 301 and the image processing unit 302 stores the recording image data in the DRAM 600 again, the recording image data is stored as individual recording image data in the DRAM 600. Details regarding a region of captured image data corresponding to each of the image processing units 301 and 302 will be described later.

Ultimately, the media I/F unit 500 acquires (reads) the recording image data stored in the DRAM 600 and causes the recording medium 501 to record the acquired (read) recording image data. This process is similar to the display latency normal mode.

Next, a method of dividing a region of one piece of image data on which image processing is performed into a plurality of regions when the image processing units 301 and 302 in the imaging device 10 share and execute display image processing in which a live view image is generated or recording image processing in which recording image data of a still image is generated will be described.

FIGS. 5A, 5B, 5C, 5D, and 5E are diagrams each schematically illustrating an example of a method of dividing a region of image data on which the image processing units (image processing units 301 and 302) in the imaging device 10 of this embodiment execute image processing. In FIG. 5A, a region of one piece of image data on which imaging processing is performed is illustrated. In FIGS. 5B to 5E, an example in which a region of image data illustrated in FIG. 5A is divided into regions corresponding to the image processing units 301 and 302 is illustrated.

In FIG. 5B, the case in which the region of the image data illustrated in FIG. 5A is divided into two regions in the left and right directions, the image processing unit 301 performs image processing on the image data of the left region, and the image processing unit 302 performs image processing on the image data of the right region is illustrated.

In addition, in FIG. 5C, the case in which the region of the image data illustrated in FIG. 5A is divided into two regions in up and down directions, the image processing unit 301 performs image processing on the image data of the upper region, and the image processing unit 302 performs image processing on the image data of the lower region is illustrated.

In addition, in FIG. 5D, the case in which the region of the image data illustrated in FIG. 5A is divided into four thin rectangles in the horizontal direction, the image processing unit 301 performs image processing on image data of odd-numbered thin rectangular regions, and the image processing unit 302 performs image processing on image data of even-numbered thin rectangular regions is illustrated. Likewise, the case in which the region has been divided into a plurality of thin rectangular regions in a vertical direction can be considered.

In addition, in FIG. 5E, the case in which the region of the image data illustrated in FIG. 5A is divided into 20 block regions by dividing the region into 4 block regions in the left and right directions and dividing the region into 5 block regions in the up and down directions, and each of the image processing units 301 and 302 performs image processing on image data of a different block region is illustrated.

A method of dividing a region of image data on which each of the image processing units 301 and 302 performs image processing is not limited to the examples illustrated in FIG. 5. The region of the image data can be divided in various different methods.

In this manner, when recording image data of a still image is generated while a live view image is displayed in the display latency reduction mode, the image processing units 301 and 302 perform the same image processing in parallel by performing display image processing and recording image processing according to time division. In this manner, the display image processing is executed by two image processing units in parallel, so that it is possible to generate a live view image of each frame for a shorter time than when one image processing unit executes display image processing. Thereby, it is possible to set a phase difference between the vertical synchronization signals CCDVD and TFTVD to a phase difference P2, which is shorter than a phase difference P, and to display the live view image on the display device 401 in shorter display latency than in the imaging device of the related art. In addition, two image processing units execute recording image processing in parallel, and therefore the two image processing units execute display image processing in parallel. In spite of this, it is possible to generate recording image data of a still image in a time similar to that when one image processing unit executes recording image processing and to cause the recording medium 501 to record the recording image data of the still image.

Even when the phase difference between the vertical synchronization signals CCDVD and TFTVD has been set to the phase difference P2 in the display latency reduction mode, a cycle of each of the vertical synchronization signals CCDVD and TFTVD is the same as in the display latency normal mode. Accordingly, in the display latency reduction mode, only the display latency (delay time) until the image sensor 100 causes the display device 401 to display a live view image after performing imaging is shorter than that of the live view display in tire imaging device of the related art.

In addition, in FIGS. 2A and 2B, the case in which each of the image processing units 301 and 302 operates according to the timings of the vertical synchronization signals CCDVD and TFTVD is illustrated. However, the timing at which each of the image processing units 301 and 302 operates is not limited to the timings of the examples illustrated in FIGS. 2A and 2B, and may be any timing as long as there is a timing corresponding to the vertical synchronization signal CCDVD or TFTVD. For example, each of the image processing units 301 and 302 may be configured to start the display image processing at the timing before the vertical synchronization signal CCDVD generated based on the vertical synchronization signal TFTVD.

The CPU 700 controls switching between the display latency normal mode and the display latency reduction mode according to the imaging device 10, that is, a change of display latency of a live view image and switching between operations of the image processing units 301 and 302. That is, the switching of the setting of the phase difference P and the operations of the image processing units 301 and 302 illustrated in FIG. 2A and the setting of the phase difference P2 and the operations of the image processing units 301 and 302 illustrated in FIG. 2B is performed by the CPU 700.

Next, the change of the display latency of the live view image to be performed by the CPU 700 in the imaging device 10 and the switching process between the operations of the image processing units 301 and 302 will be described. FIG. 6 is a flowchart illustrating a processing procedure of changing display latency of a live view image and switching image processing to be executed in the imaging device 10 of this embodiment. In FIG. 6, a control processing procedure to be performed by the CPU 700 for each component within the imaging device 10 in the display latency reduction mode is illustrated. In the description of the flowchart of the change of the display latency and the switching of image processing illustrated in FIG. 6, an example in which the display image processing of each frame of a live view image to be displayed in short display latency and the recording image processing of a still image to be recorded are executed in parallel will be described.

The CPU 700 determines whether the switching to the display latency reduction mode is necessary and starts a processing procedure in the display latency reduction mode illustrated in FIG. 6 upon determining that the switching to the display latency reduction mode is necessary. The CPU 700 determines that the switching to the display latency reduction mode is necessary when a user (photographer) of the imaging device 10, for example, changes a menu setting of the imaging device 10 to make a setting in which the live view display is performed in the display latency reduction mode or operates a mode dial of the imaging device 10 to select the mode in which the live view display is performed in the display latency reduction mode. In addition, the CPU 700, for example, determines that the switching to the display latency reduction mode is necessary in a mode (for example, a sports mode or the like) in which the live view display is performed in the display latency reduction mode using a scene discrimination function mounted on the imaging device 10. In addition, the CPU 700, for example, determines that the switching to the display latency reduction mode is necessary when the photographer (user) switches a display destination of the live view image to the EVF according to eye contact with the EVF in the imaging device 10 having both the TFT-LCD and the ENT as the display device 401.

Upon starting the change of the display latency and the process of switching image processing, the CPU 700 first sets the phase difference between the vertical synchronization signals CCDVD and TFTVD to a short phase difference in step S1. For example, the setting of the phase difference is changed from the phase difference P illustrated in FIG. 2A to the phase difference P2 illustrated in FIG. 2B. Thereby, it is possible to start the live view display in the display latency reduction mode.

Subsequently, in step S2, the CPU 700 determines whether the vertical synchronization signal CCDVD has been detected. When a result of the determination according to step S2 indicates that the vertical synchronization signal CCDVD has not been detected ("No" of step S2), the CPU 700 iterates the detecting of the vertical synchronization signal CCDVD in step S2 until the vertical synchronization signal CCDVD is detected, and proceeds to step S3 when the vertical synchronization signal CCDVD has been detected ("Yes" of step S2).

Subsequently, in step S3, the CPU 700 determines whether there is recording image processing executed by the image processing units 301 and 302 in parallel. When the result of the determination according, to step S3 indicates that there is recording image processing executed by the image processing units 301 and 302 in parallel ("Yes" of step S3), the process proceeds to step S4. When there is no recording image processing executed by the image processing units 301 and 302 in parallel ("No" of step S3), the process proceeds to step S5.

When there is recording image processing executed by the image processing units 301 and 302 in parallel in step S3, the CPU 700 temporarily stops the recording image processing executed by the image processing units 301 and 302 in parallel in step S4.

Thereafter, the CPU 700, for example, causes the DRAM 600 to store current settings and image processing states in the recording image processing executed by the image processing units 301 and 102.

Figure 7:
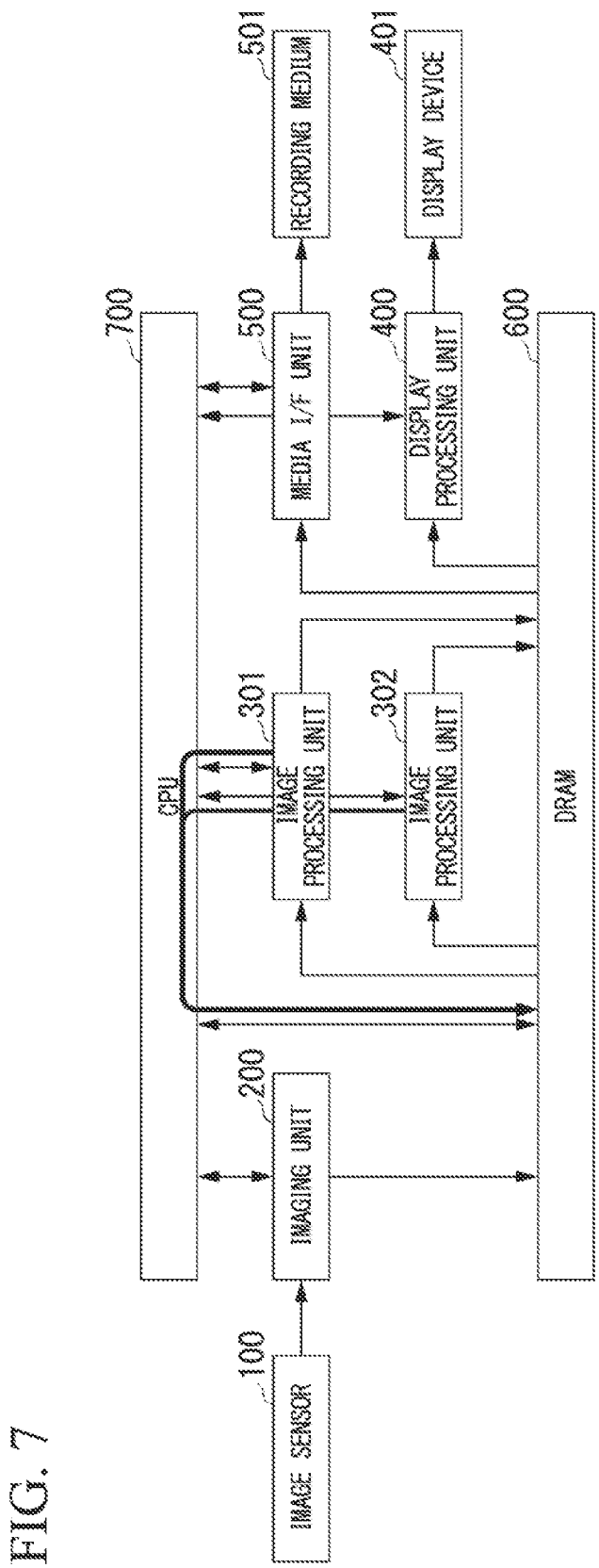
FIG. 7 is a diagram schematically illustrating a flow of setting data in the imaging device of this embodiment.

Here, a flow of setting data when the CPU 700, for example, causes the DRAM 600 to store the setting values and the image processing states (hereinafter collectively referred to as setting data) in the recording image processing executed by the image processing units 301 and 302 will be described. FIG. 7 is a diagram schematically illustrating a flow of setting data in the imaging device 10 of this embodiment. In FIG. 7, for example, a flow of setting data at the time of saving a setting value such as a parameter of image processing or a state such as progress information of image processing set in a register of each of the image processing units 301 and 302 to be used when the image processing units 301 and 302 perform recording image processing in the processing recording DRAM 600 is illustrated.

When the setting data of the image processing units 301 and 302 is stored, the CPU 700 first reads the setting data set in each of the image processing units 301 and 302 as illustrated in FIG. 7. Thereafter, the CPU 700 stores (writes) the read setting data in the DRAM 600. According to this processing, it is possible to store current settings of the recording image processing performed by the image processing units 301 and 302.

Subsequently, in step S5, the CPU 700, for example, sets a setting value such as a parameter of image processing set in a register of each of the image processing units 301 and 302 to be used when the image processing units 301 and 302 perform display image processing in which a be view image is generated in parallel in each of the image processing units 301 and 302. At this time, the setting value, for example, is a setting value in which the image processing unit 301 executes the display image processing on image data of a left region and the image processing unit 302 executes the display image processing on image data of a right region when the region of the image data is divided into two regions in the left and right directions as illustrated in FIG. 5B.

Thereafter, in step S6, the CPU 700 causes the image processing units 301 and 302 to start the display image processing in parallel. Thereby, the imaging device 10 can complete the generation of a live view image of one frame in a shorter time than when one image processing unit executes the display image processing, for example, in about half a time for the imaging device of the related art. Thereby, as illustrated in FIG. 2B, the imaging device 10 can display an image corresponding, to the live view image on the display device 401 in the phase difference P2 between the vertical synchronization signals CCDVD and TFTVD set to a short value.

Subsequently, in step S7, the CPU 700 determines whether the image processing units 301 and 302 have completed display image processing executed in parallel. When a result of the determination according to step S7 indicates that the image processing units 301 and 302 have not completed the display image processing ("No" of step S7), the CPU 700 iterates a determination of whether the display image processing has been completed in step S7 until the image processing units 301 and 302 complete the display image processing. In addition, when the image processing units 301 and 302 have completed the display image processing ("YES" of step S7), the process proceeds to step S8.

Subsequently, in step S8, the CPU 700 determines whether the recording image processing executed by the image processing units 301 and 302 in parallel has already been completed. When the result of the determination in step S8 indicates that the recording image processing executed by the image processing units 301 and 302 in parallel has already been completed ("Yes" of step S8), the process proceeds to step S11. When the result of the determination in step S8 indicates that the recording image processing executed by the image processing units 301 and 302 in parallel has not yet been completed ("No" of step S8), the process proceeds to step S9.

When the recording image processing executed by the image processing units 301 and 302 in parallel has not yet been completed in step S8, the CPU 700, for example, resets the settings of the recording image processing executed by the image processing units 301 and 302 stored in the DRAM 600 until the process is temporarily stopped in each of the image processing units 301 and 302 in step S9. That is, the settings of the recording image processing executed by the image processing units 301 and 302 in parallel until the process is temporarily stopped in step S4 are returned. Thereafter, in step S10, the CPU 700 causes the image processing units 301 and 302 to restart the recording image processing.

Figure 8:
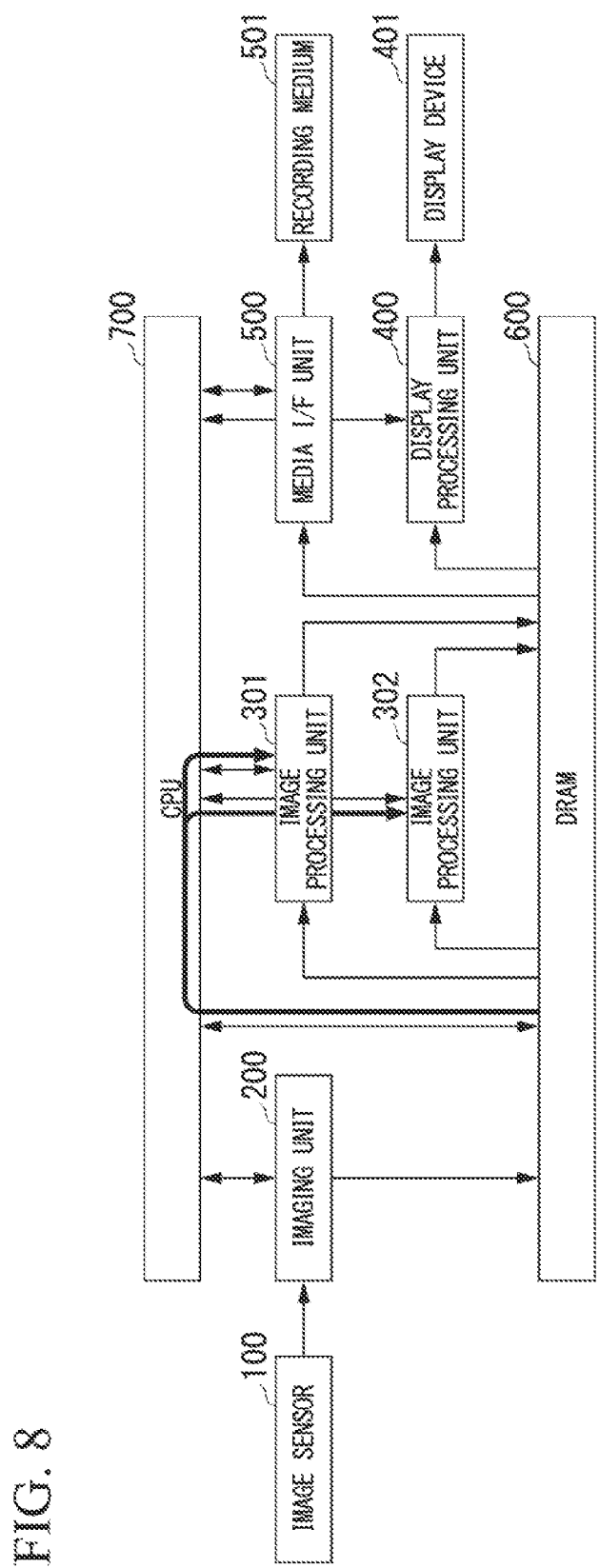
FIG. 8 is a diagram schematically illustrating a flow of setting data, in the imaging device of this embodiment.
Figure 9:
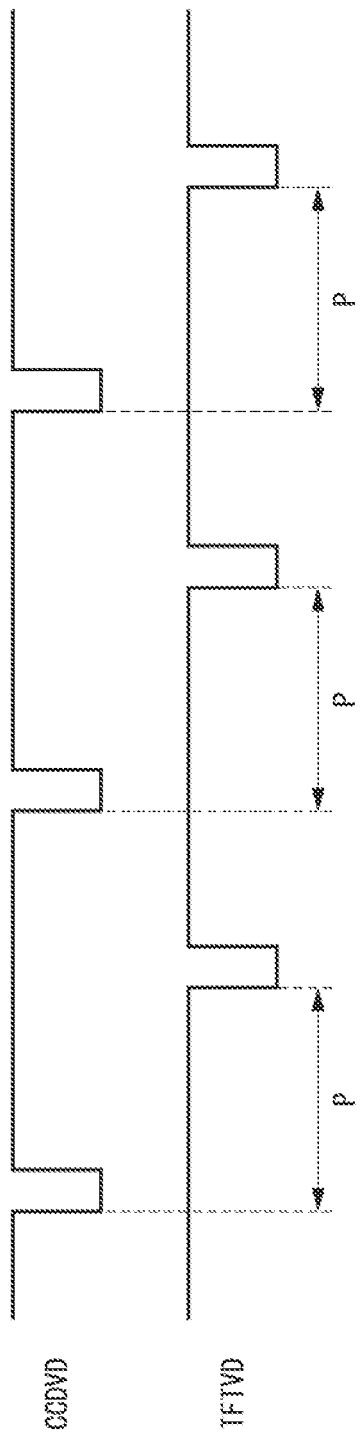
FIG. 9 is a timing chart illustrating an example of a relationship between the timing of the image sensor and the timing of the display device in the imaging device of the related art.

Here, a flow of setting data when the CPU 700 causes the setting data in the recording image processing stored in the DRAM 600 to be returned to the image processing units 301 and 302 will be described. FIG. 8 is a diagram schematically illustrating a flow of setting data in the imaging device 10 of this embodiment. In FIG. 8, for example, a flow of setting data when a setting value such as a parameter of image processing or a state such as progress information of image processing set in a register of each of the image processing units 301 and 302 is returned to the image processing units 301 and 302 so that continuous recording image processing is performed is illustrated.

When the setting data of the image processing units 301 and 302 is returned, the CPU 700 first acquires (reads) the setting data stored in the DRAM 600 as illustrated in FIG. 8. Thereafter, the CPU 700 sets read setting data in each of the image processing units 301 and 302. Through this process, it is possible to return the settings of the recording image processing executed by the image processing units 301 and 302 until the process is temporarily stopped in step S4.

Subsequently, in step S11, the CPU 700 determines Whether to continue the processing in the display latency reduction mode, that is, determines whether to perform the switching to the display latency normal mode. When a result of the determination according to step S11 indicates that the process continues in the display latency reduction mode ("Yes" of step S11), the process returns to step S2 and the process from steps S2 to S11 is iterated. Thereby, in the imaging device 10, it is possible to generate recording image data of a still image while performing a live view display in short display latency.

On the other hand, when the result of the determination according to step S11 indicates that the process does not continue in the display latency reduction mode ("No" of step S11), the process proceeds to step S12. The CPU 700 determines that the process does not continue in the display latency reduction mode when the user (photographer) of the imaging device 10, for example, changes a menu setting of the imaging device 10 to make a setting in which the live view display is performed in the display latency reduction mode or operates a mode dial of the imaging device 10 to select the mode in which the live view display is performed in the display latency reduction mode. In addition, the CPU 700, for example, determines that the process of the display latency reduction mode does not continue when it is discriminated that there is a mode (for example, a portrait mode or the like) in which the live view display is performed in the display latency normal mode according to a scene discrimination function mounted on the imaging device 10. In addition, for example, in the imaging device 10 having the TFT-LCD and the EVF as the display device 401, the CPU 700 determines that the process in the display latency reduction mode does not continue when a predetermined time has elapsed after the photographer (user) has discontinued eye contact with the EVF or when the user switches a display destination of the live view image to the TFT-LCD.

When the process does not continue in the display latency reduction mode, that is, when the switching to the display latency normal mode is performed, in step S11, the CPU 700 ends the process in the display latency reduction mode by setting the phase difference between the vertical synchronization signals CCDVD and TFTVD to a normal phase difference, that is, by restoring the setting of the phase difference, in step S12. For example, the setting of the phase difference is changed from the phase difference P2 illustrated in FIG. 2B to the phase difference P illustrated in FIG. 2A. Thereby, it is possible to return to the live view display in the display latency normal mode. Thereby, in the imaging device 10, as illustrated in FIG. 2A, it is possible to display an image corresponding to a live view image on the display device 401 in the phase difference P between the normal vertical synchronization signals CCDVD and TFTVD.

In the imaging device 10, an image corresponding to a live view image may be displayed on the display device 401 in a phase difference between the vertical synchronization signals CCDVD and TFTVD constantly set to a short value by constantly performing the process in the display latency reduction mode. However, when the process is constantly executed in the display latency reduction mode, the image processing units 301 and 302 constantly operate. Because of this, in order to suppress an increase in the overall power consumption of the imaging device 10, when the live view display does not continue in the display latency reduction mode, it is desirable to return to the live view display in the display latency normal mode.

As described above, according to a mode for practicing the present invention, a plurality of image processing units are provided within the imaging device. The image processing units share and execute display image processing in which a live view image of the same frame is generated in parallel by switching the image processing to be executed by the image processing units. In addition, after the generation of the live view image of each flame has ended, the image processing units share and execute the recording image processing for generating one still image to be recorded in parallel. That is, in a mode for practicing the present invention, the display image processing in which the live view image is processed and the recording image processing in which the still image is generated are performed according to time division and hence the image processing units are controlled to perform the same image processing in parallel.

Thereby, in a mode for practicing the present invention, it is possible to generate a live view image of each frame in a shorter time than when one image processing unit executes display image processing. Accordingly, it is possible to shorten a delay time (display latency) until the image sensor generates a live view image and displays the generated live view image on the display device after performing imaging. In addition, in a mode for practicing the present invention, it is possible to generate a still image in a time similar to that when one image processing unit executes the recording image processing even though a plurality of image processing units execute the display image processing in parallel. Thereby, in a mode for practicing the present invention, it is possible to provide an imaging device in which it is difficult to miss the timing (shutter chance) at which a still image is captured in a state in which the performance of a still-image generation process similar to that of the imaging device of the related art is secured.

An example in which the display image processing of each frame of the live view image and the recording image processing of the still image to be recorded are executed in parallel has been described in this embodiment. However, the image processing to be executed in parallel with the display image processing is not limited to the recording image processing described in the mode for practicing the present invention. The idea of the present invention is applicable even when the display image processing and other image processing are executed in parallel.

In addition, the case of the imaging device 10 having the two image processing units 301 and 302 has been described in this embodiment. However, the number of image processing units provided in the imaging device is not limited to the mode for practicing the present invention. For example, three image processing units can be provided within the imaging device and the respective image processing units can be configured to perform the same image processing as the display image processing in which the live view image is generated and the recording image processing in which the still image is generated in parallel according to time division. In addition, in this case, some image processing units among a plurality of image processing units provided in the imaging device can be configured to perform the same image processing in parallel according to time division. For example, when three image processing units are provided within the imaging device, two image processing units among the three image processing units can be configured to perform the same image processing as the display image processing and the recording image processing in parallel.

In addition, the case in which the CPU 700 controls the change of the display latency of the live view image and the switching between the operations of the image processing units 301 and 302 has been described in this embodiment. However, the control is not limited to the modes for practicing the present invention. For example, the CPU 700 does not control processing of the change of the display latency of the live view image and the switching of the image processing to be executed, but one or both of sequencers provided within the image processing units 301 and 302 can be configured to cooperatively control the change of the display latency of the live view image and the switching between the operations of the image processing units 301 and 302.

In addition, the case in which current settings of the recording image processing executed by the image processing units 301 and 302 are stored in the DRAM 600 after the recording image processing executed by the image processing units 301 and 302 in parallel has been temporarily stopped in step S4 in a processing procedure of the display latency reduction mode illustrated in FIG. 6 has been described in this embodiment. However, a position at which setting data is stored in the recording image processing is not limited to the modes for practicing the present invention. For example, there may be a configuration in which the setting data is stored within the image processing unit such as a configuration in which two registers to store the setting data for use in image processing are provided in each of the image processing units 301 and 302. In this case, for example, the CPU 700 is configured to perform control for saving setting data within the image processing units in step S4 and perform control for returning the setting data stored within the image processing units in step S9.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. An imaging device comprising:
   an imaging unit which includes a solid-state imaging device, which outputs a pixel signal corresponding to incident subject light at a predetermined timing of a first synchronization signal, and the imaging unit being configured to output captured image data corresponding to the pixel signal output by the solid-state imaging device;
   a plurality of image processing units configured to generate any one of first image data, which is generated by first image processing on the captured image data output from the imaging unit, and second image data, which is generated by second image processing on the captured image data;
   a display processing unit configured to output the second image data to a display device, which displays an image corresponding to image data input at a predetermined timing of a second synchronization signal, and to cause an image corresponding to the second image data to be displayed; and
   a control unit configured to change a setting of a phase difference between the first synchronization signal and the second synchronization signal, and to switch between the first image processing and the second image processing to be executed by each of the plurality of image processing units, wherein
   when a predetermined image processing unit among the plurality of image processing units generates the first image data and an image processing unit different from the predetermined image processing unit generates the second image data, the control unit sets the phase difference between the first synchronization signal and the second synchronization signal to a first phase difference, and
   when the phase difference between the first synchronization signal and the second synchronization signal is set to a second phase difference which is shorter than the first phase difference, the control unit switches the first image processing and the second image processing to be executed by each of the plurality of image processing units so that some image processing units among the plurality of image processing units share and execute image processing of any one of the first image processing and the second image processing on the same captured image data in parallel.

2. The imaging device according to claim 1, wherein
the control unit, upon detecting the first synchronization signal in a state in which the phase difference between the first synchronization signal and the second synchronization signal has been set to the second phase difference, first switches so that the some image processing units share and execute the second image processing in parallel at a timing corresponding to the detected first synchronization signal, and
the control unit, after being ended the generation of the second image data by the second image processing, switches so that the some image processing units share and execute the first image processing in parallel.

3. The imaging device according to claim 2, wherein
the control unit, upon detecting the first synchronization signal when the some image processing units share and execute the first image processing in parallel in the setting of the second phase difference, interrupts the first image processing currently being executed by the some image processing units at a timing corresponding to the detected first synchronization signal, and causes the some image processing units to share and execute the second image processing in parallel after causing to be stored a current setting or a state of the interrupted first image processing, and
the control unit, after being ended the generation of the second image data by the second image processing, causes to return the current setting or state of the interrupted first image processing and then causes the some image processing units to continuously restart the first image processing.

4. The imaging device according to claim 2, wherein the control unit divides a region of the captured image data into a plurality of regions in the left and right directions and causes any one of the first image processing and the second image processing for the same captured image data before dividing the region, to be shared and be executed in parallel in the plurality of image processing units by causing one of the plurality of image processing units to execute any one of the first image processing and the second image processing on captured image data of each of the divided regions.

5. The imaging device according to claim 2, wherein the control unit divides a region of the captured image data into a plurality of regions in the up and down directions and causes any one of the first image processing and the second image processing for the same captured image data before dividing the region, to be shared and be executed in parallel in the plurality of image processing units by causing one of the plurality of image processing units to execute any one of the first image processing and the second image processing on captured image data of each of the divided regions.

6. The imaging device according to claim 2, wherein the control unit divides a region of the captured image data into a plurality of regions in the up, down, left, and right directions and causes any one of the first image processing and the second image processing for the same captured image data before dividing the region, to be shared and be executed in parallel in the plurality of image processing units by causing one of the plurality of image processing units to execute any one of the first image processing and the second image processing on captured image data of each of the divided regions.

7. The imaging device according to claim 1, wherein
the first image processing is image processing in which recording image data for recording an image corresponding to the captured image data is generated as the first image data, and
the second image processing is image processing in which display image data for displaying the image corresponding to the captured image data of each frame corresponding to a pixel signal of each frame which the solid-state imaging device outputs based on the timing of the first synchronization signal in the display device, is generated as the second image data.

8. An imaging method comprising:
an imaging step of outputting captured image data corresponding to a pixel signal output by a solid-state imaging device which outputs the pixel signal corresponding to incident subject light at a predetermined timing of a first synchronization signal;
a plurality of image processing steps of generating any one of first image data being generated by first image processing on the captured image data output in the imaging step and second image data being generated by second image processing on the captured image data;
a display processing step of outputting the second image data to a display device, which displays an image corresponding to image data input at a predetermined timing of a second synchronization signal and causing an image corresponding to the second image data to be displayed; and
a control step of changing a setting of a phase difference between the first synchronization signal and the second synchronization signal and switches between the first image processing and the second image processing to be executed in each of the plurality of image processing steps wherein
when the first image data is generated by a predetermined image processing step among the plurality of image processing steps and the second image data is generated by an image processing unit different from the predetermined image processing step, the phase difference between the first synchronization signal and the second synchronization signal is set to a first phase difference by the control step, and
when the phase difference between the first synchronization signal and the second synchronization signal is set to a second phase difference which is shorter than the first phase difference, the control step is performed to switch the first image processing and the second image processing to be executed by each of the plurality of image processing steps so that image processing of any one of the first image processing and the second image processing on the same captured image data in parallel is shared and executed by some image processing steps among the plurality of image processing steps.

* * * * *